United States Patent [19]

Baxter

[11] Patent Number: 5,212,510
[45] Date of Patent: May 18, 1993

[54] COMPACT CAMERA WITH ELASTIC LENS COVER TO PREVENT ABRASION OF TAKING LENS

[75] Inventor: Dennis E. Baxter, East Rochester, N.Y.

[73] Assignee: Eastman Kodak Company, Rochester, N.Y.

[21] Appl. No.: 838,120

[22] Filed: Feb. 18, 1992

[51] Int. Cl.$^5$ .................. G03B 17/04; G03B 15/03; G03B 13/04; G03B 11/04
[52] U.S. Cl. ................ 354/187; 354/149.11; 354/219; 354/287; 359/511
[58] Field of Search ........... 354/187, 149.11, 219, 354/287; 206/316.1, 316.2, 389; 359/507, 511

[56] References Cited

U.S. PATENT DOCUMENTS

| | | | |
|---|---|---|---|
| 2,759,405 | 8/1956 | Harter | 354/191 |
| 4,557,571 | 12/1985 | Reibl | 354/149.11 |
| 4,983,999 | 1/1991 | Meisezahl et al. | 354/149.11 |
| 4,996,548 | 2/1991 | Schappler et al. | 354/149.11 |
| 5,005,032 | 4/1991 | Burnham | 354/149.11 |

Primary Examiner—Michael L. Gellner
Assistant Examiner—J. K. Han
Attorney, Agent, or Firm—Roger A. Fields

[57] ABSTRACT

A photographic camera comprises a camera body, a lens carrier for an objective lens supported for movement outwardly and inwardly of the camera body between respective picture-taking and storage positions, and a lens cover supported for movement relative to the camera body between a covering position in front of the objective lens when the lens carrier is in its storage position and a non-covering position removed from the objective lens when the lens carrier is in its picture-taking position. According to the invention, the lens cover includes an elastic sheet-like piece located to deform over the objective lens when the lens carrier is in its storage position and the lens cover is in its covering position, whereby the lens cover is prevented from abrading the objective lens.

7 Claims, 2 Drawing Sheets

COMPACT CAMERA WITH ELASTIC LENS COVER TO PREVENT ABRASION OF TAKING LENS

BACKGROUND OF THE INVENTION

1. Field of the Invention

The invention relates generally to the field of photography, and in particular to compact folding cameras.

2. Description of the Prior Art

The classical folding camera is one in which a lens carrier for an objective lens is translatable along the lens optical axis between a folded storage position retracted in the camera body and a non-folded picture-taking position extended from the camera body. Typically, a lens cover is pivotally connected to the camera body for swinging movement between a covering position in front of the objective lens when the lens carrier is in its folded position and a non-covering position removed from the objective lens when the lens carrier is in its non-folded position. See commonly assigned U.S. Pat. Nos. 2,759,405, issued Aug. 21, 1956, and 4,557,571, issued Dec. 10, 1985, for example.

In a folding camera such as disclosed in U.S. Pat. No. 4,557,571, when the lens cover is swung from its non-covering position to its covering position, it pushes the lens carrier inwardly of the camera body to translate the lens carrier from its non-folded position to its folded position. However, since the lens cover is relatively inelastic, it may abrade or scratch the objective lens as it pushes against the lens carrier.

SUMMARY OF THE INVENTION

A photographic camera comprises a camera body, a lens carrier for an objective lens supported for movement outwardly of the camera body between respective picture-taking and storage positions, and a lens cover supported for movement relative to the camera body between a covering position in front of the objective lens when the lens carrier is in its storage position and a non-covering position removed from the objective lens when the lens carrier is in its picture-taking position. According to the invention, the lens cover includes an elastic sheet-like piece located to deform over the objective lens when the lens carrier is in its storage position and the lens cover is in its covering position, whereby the lens cover is prevented from abrading the objective lens.

DETAILED DESCRIPTION OF THE PREFERRED EMBODIMENT

The invention is described as being embodied in a compact folding 35 mm camera with a built-in flash/lens cover. Because such photographic cameras have become well known as typified by U.S. Pat. No. 4,557,571, this description is directed in particular to camera elements forming part of or cooperating directly with the preferred embodiment. It is to be understood, however, that camera elements not specifically shown or described may take various forms known to persons of ordinary skill in the art.

Figure 1:
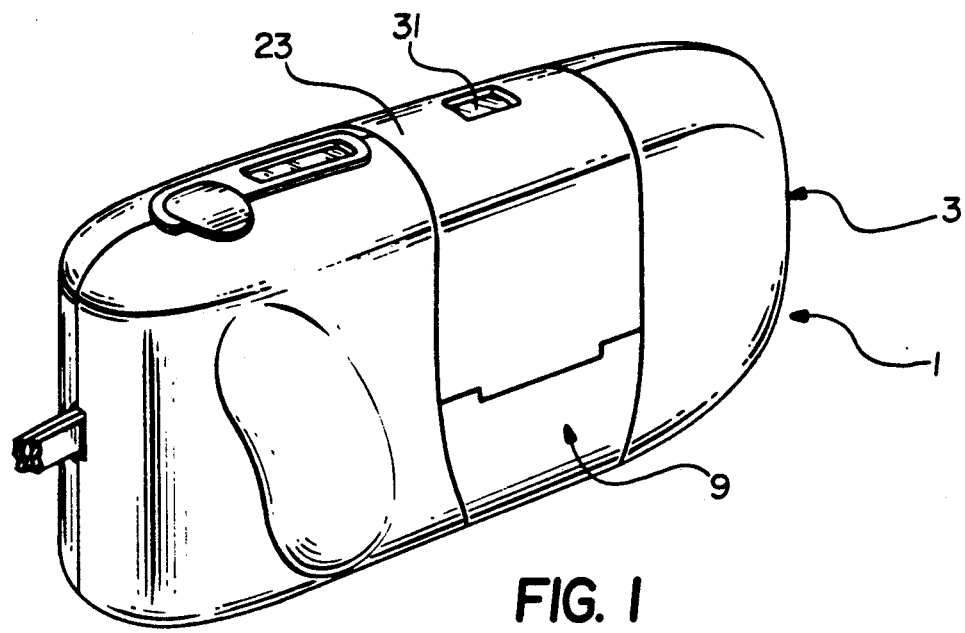
FIG. 1 is a front perspective view of a photographic camera with a flip-up flash/lens cover according to a preferred embodiment of the invention, showing the flash/lens cover in a covering position.
Figure 2:
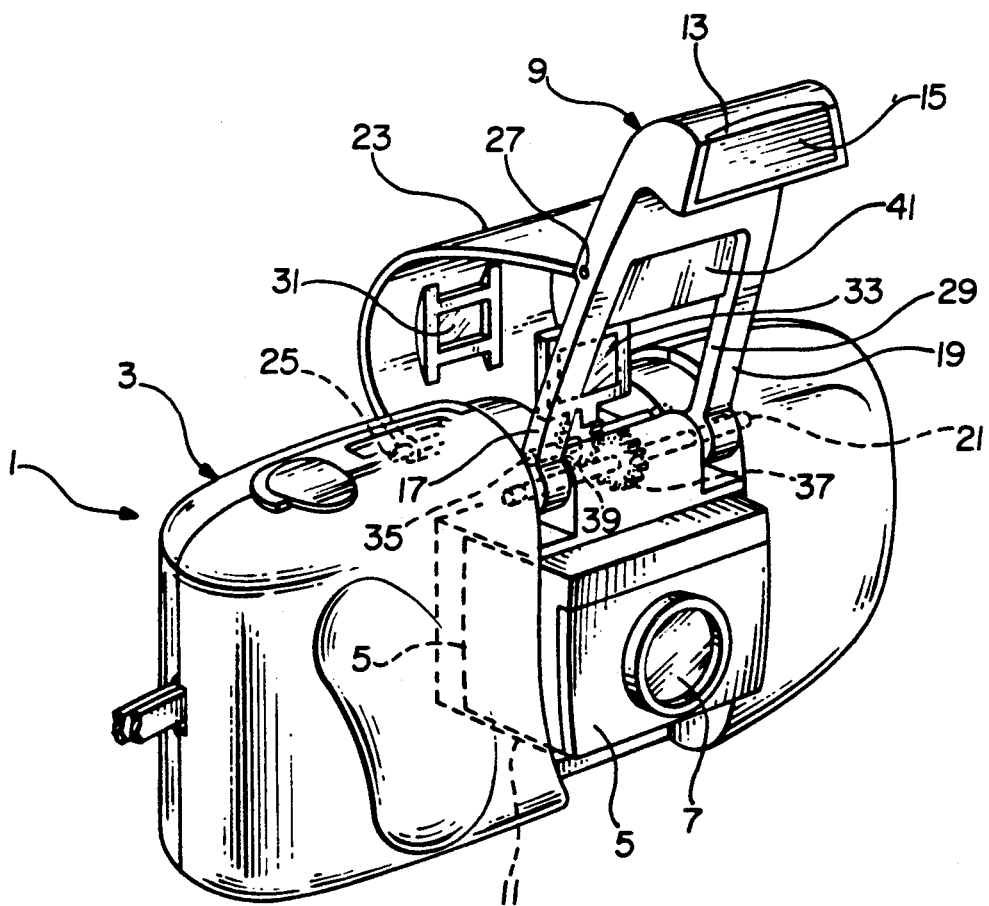
FIG. 2 is a front perspective view similar to FIG. 1, showing the flash/lens cover in a non-covering position.

Referring now to the drawings, FIGS. 1 and 2 show a compact 35 mm camera 1 comprising a contoured camera body 3, a lens carrier 5 for an objective (taking) lens 7 and a flip-up flash/lens cover 9.

Figure 3:
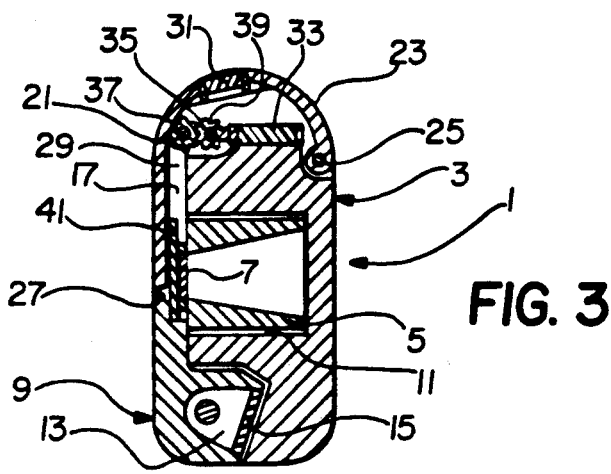
FIGS. 3, 4 and 5 are side elevation section views of the photographic camera, showing progressive movement of the flash/lens cover from its covering position to its non-covering position.
Figure 5:
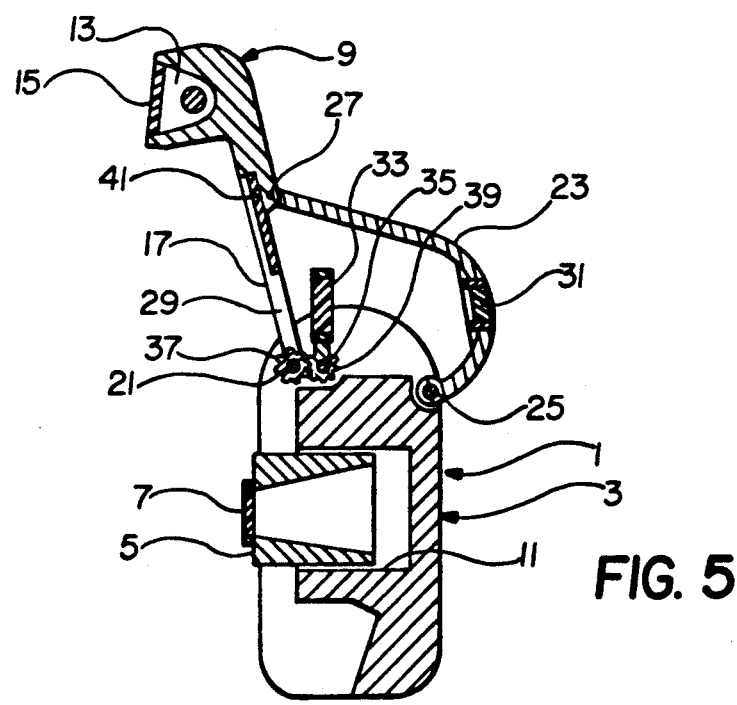

The lens carrier 5 is supported in a light-tight channel 11 in the camera body 3 for translation outwardly and inwardly of the camera body, along the len's optical axis (not shown), between a picture-taking position shown in FIGS. 2 and 5 and a storage position shown in FIG. 3. A compression spring (not shown) urges the lens carrier 5 to its picture-taking position, and known stops (not shown) prevent translation of the lens carrier outwardly beyond that position. Alternatively, the lens carrier 5 can be supported for movement between its picture-taking and storage position as shown in U.S. Pat. No. 4,557,571.

Figure 4:
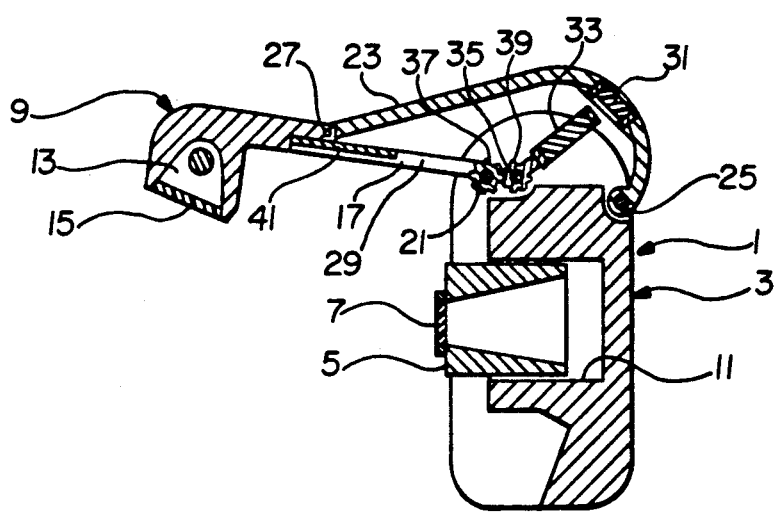

The flash/lens cover 9 includes a known electronic flash unit 13 having a flash emission window 15 and a pair of spaced rigid legs 17 and 19. The rigid legs 17 and 19 are pivotally connected to the camera body 3 by means of a coaxial pin 21 to support the flash/lens cover 9 for manually swinging movement about the coaxial pin between a covering position in front of the objective lens 7 when the lens carrier 5 is in its storage position shown in FIG. 3 and a non-covering position elevated from the camera body when the lens carrier is in its picture-taking position shown in FIGS. 2 and 5. As the flash/lens cover 9 is manually swung from its non-covering position to its covering position, the rigid legs 17 and 19 move against the lens carrier 5 to push the lens carrier further into the channel from its picture-taking position to its storage position. See FIGS. 3-5.

A separate plastic cover part 23 is pivotally connected to the camera body 3 by means of an axial pin 25 and is pivotally connected to the rigid legs 17 by respective coaxial pins 27. This connection causes the cover part 23 to act as a rear support or brace for the flash/lens cover 9 when the flash/lens cover is in its non-covering position shown in FIGS. 2 and 5 and to act as a lid or cover for a space 29 between the rigid legs 17 and 19 when the flash/lens cover is in its covering position shown in FIGS. 1 and 3.

The space 29 between the rigid legs 17 and 19 is located to act as a viewfinder opening for viewing a subject through the opening when the flash/lens cover 9 is in its non-covering position shown in FIGS. 2 and 5. To enhance the view of the subject, the cover part 23 includes a finder eye-lens 31. In addition, a finder front-lens 33 is pivotally connected to the camera body 3 by means of an axial pin 35 to support the finder front-lens for swinging movement about the axial pin between a collapsed folded position shown in FIG. 3 and an erect viewing position shown in FIGS. 2 and 5. Respective gears 37 and 39 fixed to the axial pins 21 and 35 for the flash/lens cover 9 and the finder front-lens 33 continuously engage to swing the finder front-lens from its folded position to its viewing position responsive to swinging the flash/lens cover 9 from its covering position to its non-covering position. See FIGS. 3-5. Conversely, the gears 37 and 39 swing the finder front lens 33 from its viewing position to its folded position responsive to swinging the flash/lens cover from its non-covering position to its covering position. When the flash/lens cover 9 is in its non-covering position shown in FIGS. 2 and 5, the finder front-lens 33 is located between the space 29 and the finder eye-lens 31 in optical alignment with the space and the eye-lens. Thus, one views a subject by looking through the finder eye-lens 33, the finder front-lens 31, and the space 29. Further details of this arrangement are disclosed in U.S. Pat. No. 5,005,032 issued Apr. 2, 1991.

An elastic sheet-like piece 41, preferably rubber, is secured to the flash/lens cover 9 in the space 29 between the rigid legs 17 and 19 to deform or stretch over the objective lens 7 when the lens carrier 5 is in its storage position and the flash/lens cover is in its covering position. See FIG. 3. The elastic piece 41 is opaque to act as a light baffle for limiting the field of view when looking at a subject through the finder eye-lens 31, the finder front-lens, and the space 29. See FIG. 5.

When the flash/lens cover 9 is in its covering position shown in FIGS. 1 and 3, the cover part 23 completely covers the elastic piece 41.

The invention has been described with reference to a preferred embodiment. However, it will be appreciated that various modifications can be effected within the ordinary skill in the art without departing from the scope of the invention.

I claim:

1. A photographic camera comprising a camera body, a lens carrier for an objective lens supported for movement outwardly and inwardly of said camera body between respective picture-taking and storage positions, and a lens cover supported for movement relative to said camera body between a covering position in front of said objective lens when said lens carrier is in its storage position and a non-covering position removed from the objective lens when the lens carrier is in its picture-taking position, is characterized in that:

said lens cover includes an elastic piece located to deform over said objective lens when said lens carrier is in its storage position and the lens cover is in its covering position, to prevent the lens cover from abrading the objective lens.

2. A photographic camera as recited in claim 1, wherein said lens cover includes rigid means at least partially surrounding said elastic piece to push said lens carrier inwardly of said camera body from its picture-taking position to its storage position as the lens cover is moved from its non-covering position to its covering position.

3. A photographic camera as recited in claim 1, wherein said lens cover has a viewfinder opening for viewing a subject through said viewfinder opening when the lens cover is in its non-covering position, and said elastic piece borders said viewfinder opening and is opaque to serve as a light baffle for at least partially defining the viewfinder opening.

4. A photographic camera as recited in claim 1, wherein said lens cover includes an electronic flash unit and a pair of spaced rigid legs pivotally connected to said camera body to elevate said flash unit from the camera body when the lens cover is in its non-covering position, and said elastic piece occupies at least part of a space between said rigid legs.

5. A photographic camera as recited in claim 4, wherein said rigid legs are located to push said lens carrier inwardly of said camera body from its picture-taking position to its storage position as the lens cover is moved from its non-covering position to its covering position.

6. A photographic camera as recited in claims 4 or 5, wherein said space between said rigid legs is located to provide a viewfinder opening for viewing a subject through said viewfinder opening when said lens cover is in its non-covering position, and said elastic piece borders said viewfinder opening and is opaque to serve as a light baffle for at least partially defining the viewfinder opening.

7. A photographic camera as recited in claim 4, wherein a cover part is pivotally connected to said camera body separately from said lens cover to completely cover said elastic piece when the lens cover is in its covering position.

* * * * *